United States Patent [19]

Nakao et al.

[11] 4,416,784
[45] Nov. 22, 1983

[54] FILLING COMPOSITION FOR USE IN LIQUID CHROMATOGRAPHY

[75] Inventors: Masaaki Nakao, Kunitachi; Fumio Kodama, Chofu, both of Japan

[73] Assignee: Kureha Kagaku Kogyo Kabushiki Kaisha, Nihonbashi, Japan

[21] Appl. No.: 351,350

[22] Filed: Feb. 23, 1982

Related U.S. Application Data

[63] Continuation-in-part of Ser. No. 116,215, Jan. 28, 1980, abandoned.

[51] Int. Cl.³ ............................................. B01D 15/08
[52] U.S. Cl. ...................................... 210/635; 422/70; 210/927
[58] Field of Search ...................... 210/635, 656, 198.2, 210/927; 422/70; 435/7, 180, 815; 252/426

[56] References Cited

U.S. PATENT DOCUMENTS

| | | | |
|---|---|---|---|
| 3,586,626 | 6/1971 | Heitz | 210/635 |
| 3,600,132 | 8/1971 | Goverde et al. | 422/70 |
| 3,850,798 | 11/1974 | Sjoquist | 210/635 |
| 3,960,762 | 6/1976 | Kroebel et al. | 210/635 |
| 4,140,652 | 2/1979 | Korshak et al. | 252/426 |
| 4,162,895 | 7/1979 | Cambiaso et al. | 435/7 |
| 4,225,487 | 9/1980 | Cuatrecasas | 210/656 X |

FOREIGN PATENT DOCUMENTS

1543894 4/1979 United Kingdom.

OTHER PUBLICATIONS

Introduction to Modern Liquid Chromatography by Snyder et al., John Wiley & Sons, New York, p. 335, 1974.

*Primary Examiner*—John Adee
*Attorney, Agent, or Firm*—Wegner & Bretschneider

[57] ABSTRACT

Disclosed herein is a bead-like substance comprising a hydroxymethylated copolymer of styrene and divinylbenzene having a serum protein adsorbed or adhering thereonto, suitable for filling the column used in liquid chromatography in the field of analysis, particularly in clinical examinations, and a method for analytically examining a physiological specimen by liquid column chromatography.

6 Claims, 11 Drawing Figures

FILLING COMPOSITION FOR USE IN LIQUID CHROMATOGRAPHY

CROSS-REFERENCE TO RELATED APPLICATION

This application is a continuation-in-part of our co-pending application Ser. No. 116,215, filed Jan. 28, 1980, now abandoned.

SUMMARY OF THE INVENTION

In a first aspect of the present invention, there is provided a composition for use as a filling material in a column of a liquid chromatograph which is used for producing physiological information in conjunction with clinical examination of body fluids of patients suffering from hepatic diseases or renal diseases, comprising a bead-like hydroxymethylated copolymer of styrene and divinylbenzene having a serum protein adsorbed or adhered thereonto in the range of 0.1 to 1% by weight of said bead-like hydroxymethylated copolymer on a dry basis.

In a second aspect of the present invention, there is provided a method for analytically examining a physiological specimen by liquid column chromatography comprising the steps of:
(a) stabilizing a column comprised of bead-like hydroxymethylated copolymer of styrene and divinylbenzene by passing a phosphate buffer solution or citrate buffer solution in the range of pH 6.5 to 8.0 through the column at a temperature of 5° to 70° C.,
(b) further stabilizing the column by passing an aqueous solution of serum protein containing 0.2 to 5.0% by weight of said serum protein through the column at a temperature of 5° to 70° C. wherein the serum protein is absorbed onto the column; and
(c) passing the physiological specimen to be examined through the buffer and protein stabilized column at a temperature of 20° to 40° C. in order to examine the specimen.

BACKGROUND OF THE INVENTION

The present invention relates to a novel filling composition for use in the column of a liquid chromatograph, and to a method for analytically examining a physiological specimen by liquid column chromatography.

It is extremely important for the diagnosis of diseases and the establishment of the guiding principle of treatments of the disease to obtain information on the morbid state by analysing the properties and the components of the patient's physiological specimens such as plasma, serum, cerebrospinal fluid, urine, etc.

Hitherto, such information has been obtained by various chemical and biochemical analytic means, however in the cases of elucidation of the morbid state of multifarious cases, a method of examination for obtaining exact information of the morbid state is required.

Particularly in cases of the diseases of the kidney and of the liver, according to the complicatedness of the morbid state, there has been a keen request for the development of new indications. That is, as the indications conventionally utilized of the morbid state, various determined values are mentioned, for example in the renal disease, the values representing the renal functions such as creatinine, uric acid and electrolytes in blood, protein and sugar in urine and pH of urine, and in the hepatic disease, the values representing the hepatic functions such as the activities of bioenzymes, for instance, GOT, GPT, LDH and LAP, and the components of bloods, for instance, protein and bilirubin.

These data of various determined values are playing important roles and are actually utilized for establishing the diagnosis and the guiding principles for treatment in their own ways.

However, recently it has been begun to point out that there is an intimate relationship between the uremic toxins and the morbid state of renal diseases, and the values determined by the conventional methods are not able to confirm the presence of the toxins, and moreover, no simple methods for detecting and confirming the toxins have yet been developed. Also in the hepatic diseases, in spite of the suggestion of the presence of various substances by abnormal metabolism and of the etiopathogenic substances, there are not suitable methods for detecting and confirming such substances at present.

In short, the present analytical methods of chemistry and biochemistry are not sufficient, although they are useful. And accordingly, the development of a suitable method for detecting and confirming the substance for supplying newer indications of the morbid state is keenly expected.

In consideration of the status quo, the utilization of the liquid chromatography which is one of analytical means based on the different principles from those of chemical and biochemical analytical methods has recently attracted the specialists' attention. Even thermally and chemically unstable substances are possibly determined by the liquid chromatography without being denaturation, and multiple components can be determined with a relatively small amount of the specimen, and accordingly, in principle, the applicability of the liquid chromatography in the fields of medicine and clinic is large enough. However, in order to put the liquid chromatography into practical use in the fields, there have been problems to be solved concerning the selection of the filling material, the establishment of conditions for separation in the chromatography and the pre-treatments adopted in accordance with the necessity.

For instance, Chang et al.[1] tried to detect the toxins appearing in the blood of the patient suffering from the renal disease by using the liquid chromatography with columns filled with porous beads of cross-linked dextran.

(1) T. M. S. Chang et al. "Trans. Amer. Artif. Int. Organs", Vol. XX, page 364 (1974).

As a result, Chang et al. found that in the serum of the patient suffering from the renal disease different from the normal serum there are some substances which give specific peaks in the chromatogram obtained by their liquid chromatography, and suggested that the peaks include some harmful substances.

However, there are defects in the method of Chang et al., that is, the specific peaks obtained by the method are extremely broad and the method necessitates a relatively large amount of the serum specimen of 2 to 3 ml and moreover, it takes 4 to 7 hours in treating one specimen.

Accordingly, the method is not satisfactory as the clinical method of examination.

On the other hand, Fürst[2] proposes a method of analysis of serum specimens by the high-speed liquid chromatography, however, although Fürst's method was successful in shortening the time period for analysis, there is a defect of appearing many peaks over-lapping each other in the obtained chart of the chromatography to make the separation and identification of each component difficult. In addition, either of these methods has not been tried with an intension of applying to clinical examination. That is, although the analysis of bio-specimens by liquid chromatography has been tried, even if it is possible to detect some specific peaks in the chromatogram of a specimen from the patient suffering from a disease of the liver of the kidney, the result does not inform the relationship between the progress of the morbid state and the appearance of the peaks in the chromatogram. Accordingly, both methods of Chang and Fürst have not been put into practical use.

(2) P. Fürst, "Clinical Nephrology", Vol. 5(4), page 198 (1976)

We, in consideration of the status quo, have studied the methods for effectively examining clinically the physiological specimens from patients of, particularly, renal diseases, etc., and as a result, we have found that on the application of the liquid chromatography using a specified filling composition in its columns to such physiological specimen, it is possible to separate and detect the peaks in the chromatogram, which have relationship to the progress of the morbid state of the diseases within a short time period with only a small amount of the specimen.

Accordingly, the object of the present invention is to offer a novel filling composition for use in the column used for the liquid chromatography, particularly suitable for clinical examinations.

Another object of the present invention is to offer the chromatographical technique using the column utilizing the filling composition, particularly the technique of high-speed liquid chromatography. The other objects of the present invention will be made clear from the following description.

DETAILED DESCRIPTION OF THE INVENTION

The filling composition for use in the column of the liquid chromatography according to the present invention comprises the bead-like substance consisting of a hydroxymethylated copolymer of styrene and divinylbenzene, to which serum protein has been adsorbed or is adhering.

Further, the method for analytically examining a physiological specimen by liquid column chromatography according to the present invention comprises passing said specimen through a column filled with a bead-like hydroxymethylated copolymer of styrene and divinylbenzene, a solution of a serum protein having been passed through said column filled with said bead-like hydroxymethylated copolymer in advance of said passing of said specimen.

The filling composition of the present invention is prepared as follows:

(a) The preparation of the bead-like substance comprising a hydroxymethylated copolymer of styrene and divinylbenzene:

For instance, a monomeric mixture of styrene and divinylbenzene is polymerized in suspension in a non-solvent, for instance, in water in the presence of a polymerization initiator to obtain a bead-like copolymer of styrene and divinylbenzene. By bringing the bead-like copolymer into reaction with formaldehyde, a hydroxymethylated copolymer of styrene and divinylbenzene is obtained. The commercialized bead-like copolymer of styrene and divinylbenzene hitherto available for use in the column of the high-speed chromatography as the filler may be applied as well as in the following step.

The particle size of the bead-like copolymer and its degree of hydroxymethylation are possibly selected respectively in accordance with the purpose of the liquid chromatography, however, the former is usually 5 to 50 micron in diameter and the latter is usually 0.05 to 0.5.

(b) Adsorption or adherence of serum protein onto the bead-like hydroxymethylated copolymer of styrene and divinylbenzene:

A serum protein, for instance, albumin and globulin, obtained from a broad range of mammals such as mankind, cattle, horse, dog or sheep is dissolved in a solvent mentioned as follows, and the solution is brought into contact with the bead-like hydroxymethylated copolymer under agitation and then the system is separated into the liquid and the solid to obtain a hydroxymethylated copolymer of styrene and benzene having a serum protein adsorbed or adhering thereonto. The contact process is executed by immersing the above-mentioned hydroxymethylated bead-like copolymer into the solution of serum protein or by passing the solution of serum protein through a column filled with the bead-like hydroxymethylated copolymer. In addition, adsorption or adhesion is automatically completed only by bringing the two substances into contact with each other because of the adsorbing facility of the hydroxymethylated copolymer for the serum protein.

The solution of serum protein used for adsorption or adhesion is obtained by dissolving the protein into water, a buffer solution or a buffer solution containing a salt such as sodium perchlorate or an organic solvent such as methanol, ethanol, propanol and dioxan. In cases where the concentration of the serum protein in the solution is high, the adsorption or adhesion of the serum protein to the hydroxymethylated copolymer is completed within a short time period, however, the state of the adsorption or adhesion tends to be non-uniform, while in cases where the concentration is low, it takes a long period of time for the completion of adsorption or adhesion. In such circumstances, the concentration of the serum protein in the above-mentioned solution is preferably 0.2 to 5% by weight.

As is mentioned above, after having the serum protein adsorbed or adhering onto the bead-like hydroxymethylated copolymer of styrene and divinylbenzene, the filling composition of the present invention is obtained by washing well the bead-like copolymer thus treated. In order to apply the filling composition into the liquid chromatography, the filling composition is filled into the column for use in the chromatographical analysis. However, since the interparticle coagulative tendency has been raised by the adsorption of the serum protein, the uniform filling of the filling composition into the column has come to be difficult. Care should be paid on this fact. In order to avoid the troubles on the filling of the column with the filling composition of the present invention, it is recommended that the hydroxymethylated copolymer not yet having adsorbed the serum protein is in advance filled into the column and after equipping the filled column onto the conventional apparatus of the liquid chromatography, the solution of the serum protein is passed through the column. According to the technique, the time required for the serum protein to be adsorbed or to adhere onto the bead-like hydroxymethylated copolymer becomes longer, while on the other hand there is a merit of simplification of the preparatory operation for the analysis.

On the treatment for adsorption or adhesion of the serum protein onto the bead-like hydroxymethylated copolymer, the temperature is kept at a dergee at which denaturation of the serum protein does not occur, that is, 5° to 70° C., preferably at 20° to 40° C.

The pH of the solution of the serum protein may be in the range in which the denaturation and coagulation of the serum protein do not occur, and is usually selected suitably from the range of 5 to 9, however, it is natural to avoid the isoelectric point of the serum protein. In addition, on the preparation of the solution of the serum protein, the use of a buffer solution having the same pH value as the pH value of the moving phase used for the liquid chromatography carried out by using the column filled with the filling composition of the present invention facilitates the maintenance of the steady state of the solution of the serum protein during the operation of the examination and is suitable for the purpose.

Accordingly, the adsorption or adhering of the serum protein onto the bead-like hydroxymethylated copolymer is preferably carried out under the same conditions as far as possible to those at the time of examination, in considering the stability of the filling composition of the present invention.

The amount of the serum protein adsorbed or adhering onto the bead-like hydroxymethylated copolymer of the present invention varies slightly corresponding to the kinds of the bead-like hydroxymethylated copolymer and those of the serum protein for use in the liquid chromatography, however, usually in the range of 0.1 to 1% by weight of dry matter, preferably 0.2 to 0.5% by weight of dry matter.

The column filled with the filling composition of the present invention is possibly used for examination of various physiological specimens after installing the column onto any commercial apparatus for liquid chromatography or onto any other apparatus having the same function as above, and the thus installed apparatus is able to separate and detect the components of the specimen as the peaks which have relationships to the progress of the morbid state. In addition, the physiological specimens mentioned in the present invention include the blood components such as serum and plasma, cerebrospinal fluid, lymph, ascites, urine, etc.

In the next place, the method of examination utilizing the filling composition of the present invention, particularly the method of examination of physiological specimens by the high-speed liquid chromatography can be executed under the following conditions, however, the followings only illustrate the mode of its execution referring to examples not being limited in themselves.

As the moving phase for use in the column filled with the filling composition of the present invention, water, a buffer solution or the buffer solution containing some salt component such as sodium perchlorate or an organic solvent such as methanol, ethanol, isopropyl alcohol, dioxan, etc. is preferable. Particularly preferable material as the moving phase is a phosphate or citrate buffer in the range of pH 6.5 to 8.0 preferably of pH 7.0 to 7.7 and by using the phosphate buffer, or citrate buffer as the moving phase, extremely finely separated peaks are available in the chromatogram.

In addition, since the filling composition of the present invention contains the protein and accordingly there is a probability of suffering from undesirable transformations such as the degradation by microorganisms during the long time period of using the column filled with the filling composition of the present invention, it is preferable in those cases to add a minute amount of an anti-microbial agent such as sodium azide, etc. to the moving phase.

The temperature at which the examination is carried out by using the liquid chromatography utilizing the filling composition of the present invention is 20° to 40° C. The amount of the specimen required for carrying out the analysis by the apparatus may be 1 to 15 microliter.

The liquid chromatography according to the present invention is provided with a detector comprising an ultraviolet spectrophotometer and an ordinary spectrophotometer, however, other than those mentioned, a differential refractometer, a fluorescence spectrophotometer, an infrared spectrophotometer, a radiation detector, a polarograph or a conductometer may be optionally utilized after careful selection.

In addition, in order to quantify the obtained data, the peak area on the chromatogram is possibly quantified by connecting a data-treating machine to the above-mentioned detector.

The liquid chromatography utilizing the filling composition of the present invention is not only applicable to the clinic examination but also, for instance, to separately collecting fractions after filling into a larger column.

The present invention is explained as follows by referring to the Examples, however, the scope of the present invention is not to be limited within Examples.

EXAMPLE 1

After filling a hydroxymethylated bead-like (10 to 15 microns in diameter) copolymer of styrene and divinylbenzene prepared by a well known process into a stainless-steel column of 4 mm in diameter and 50 cm in length by an ordinary technique, the column was installed onto a high-speed liquid chromatograph provided with an ultraviolet detector.

Into the thus installed column, a phosphate buffer of pH of 7.4 was introduced at a rate of 1.2 ml/min and after confirming that the indications of the recorder and of the integrating planimeter became stabilized, an aqueous 10% solution of human serum albumin was introduced into the column from the specimen-inlet. After repeating the introduction of the solution of albumin to obtain the fixed height of the indication on the recorder or the fixed value of the indication of area on the integrating planimeter, the treatment of the bead-like filler with the above-mentioned solution of albumin was completed.

Then, using the above-mentioned high-speed liquid chromatograph provided with the thus prepared column in which the bead-like filling had adsorbed or adhered to the human serum albumin completely, the examination of the serum of a normal person and the serum of a patient of chronic renal failure under dialytic treatment was carried out.

Figure 1:
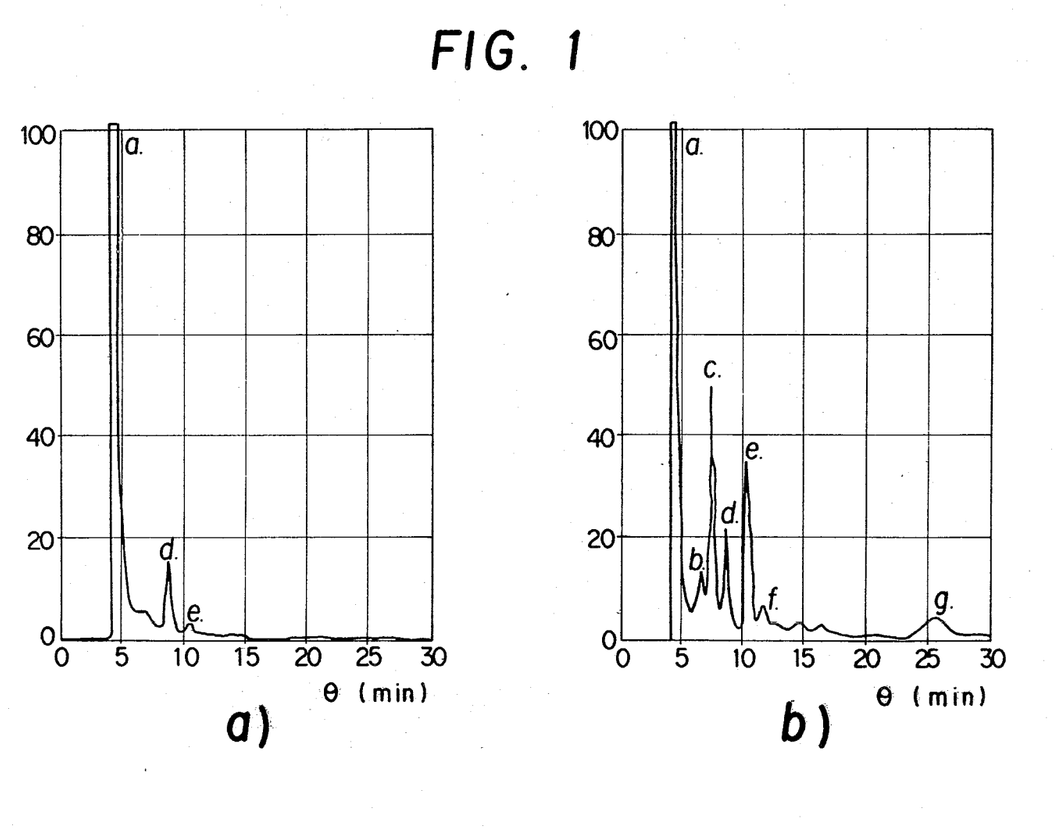
FIG. 1 of the drawings shows chromatograms of serum specimens obtained by the high-speed liquid chromatography in Example 1, and (a) is the chromatogram of normal serum, and (b) is the chromatogram of the serum of a patient suffering from renal failure.

As the results of the examination which took 30 minutes, the charts shown in FIG. 1 illustrating the peaks a, (b), (c), d, e, (f) and (g) were obtained, the parenthesized peaks appearing only on the chart of the serum of the patient of chronic renal failure.

The mutual separation of the peaks appearing only on the chart taken on the serum of the patient of chronic renal failure and their quantification suggest the application of the quantified values of these peaks as the other values of clinical examination than the conventional values of conventional clinical examination.

For comparison, the same procedure of the high-speed liquid chromatography was carried out except that the filling of the column was carried out using the same bead-like hydroxymethylated copolymer of styrene and divinylbenzene, however, without having adsorbed or adhering the serum albumin, on the serum of the patient of chronic renal failure under dialytic treatment.

The result showed that (1) the peak a was lower than that obtained by using the filling composition of the present invention and (2) the separation of the peaks b, c, d, etc. was insufficient.

TABLE 1

Effluent Time and Relative Area of Peaks of Normal Serum and Serum of Renal Failure in Liquid Chromatography

| Specimen | Relative Area of Peaks of | | | | | | |
|---|---|---|---|---|---|---|---|
|  | a | b | c | d | e | f | g |
| Normal Serum | 9895 | — | — | 323 | 52 | — | — |
| Serum of Renal failure | 8046 | 130 | 1293 | 653 | 1001 | 505 | 38 |
| Effluent time of each peak (min) | 4.7 | 6.9 | 7.8 | 8.9 | 10.6 | 11.8 to 16.5 | 25.4 |

EXAMPLE 2

Using the same high-speed liquid chromatograph equipped with the column filled with the filling composition obtained by the procedures shown in Example 1, the transition of the morbid state of a patient with the patient's history of from slight renal failure through hospitalization to the treatment with dialysis was followed by the chromatographic examination of the patient's serum as well as by the determination of BUN and creatinine. The results are shown in Table 2.

As is seen in Table 2, corresponding to the aggravation of the values of conventional clinical examination such as BUN and creatinine in the serum, the number of the abnormal peaks appearing in the chromatogram increased indicating the usefulness of the method according to the present invention.

TABLE 2

Progress of Morbid State of a Patient of Renal Failure and Results of Chromatography of the Patient's Serum

| Days of observation | Relative Area of Each Peak | | | | | | Values of clinical examn. | | Clinical findings |
|---|---|---|---|---|---|---|---|---|---|
|  | b | c | d | e | f | g | BUN | Creatinine (mg/dl) |  |
| 0 | 72 | — | 838 | 471 | — | — | 101 | 7.6 | — |
| 7 | 57 | — | 736 | 446 | — | — | 101 | 8.3 | — |
| 48 | 78 | 116 | 434 | 514 | 21 | 116 | 105 | 9.2 | aggravation |
| 56 | 95 | 214 | 534 | 618 | 70 | 191 | 104 | 9.9 | hospitalization |
| 63 | 104 | 234 | 770 | 626 | 170 | 168 | 102 | 10.8 | preparation for dialysis |
| 70 | 144 | 243 | 730 | 610 | 191 | 388 | 102 | 10.8 | — |
| 77 | 151 | 328 | 588 | 589 | 222 | 545 | 103 | 10.5 | — |

EXAMPLE 3

A female JCL-SD rat was made to be a model of the liver disorder by administration of 1,000 mg/kg of D-galactosamine and its serum was sampled before the administration (normal stage), during the morbid state and during its recovering period, and the specimens of the serum were examined by the high-speed liquid chromatograph shown in Example 1 provided with the column filled with the filling composition of the present invention. As the results, a chart shown in FIG. 2 and the relative values of area of the peaks on the chromatogram shown in Table 3 were obtained. Separately, biochemical analyses were carried out on GOT, GPT and bilirubin, the results being shown also in Table 3.

Figure 2:
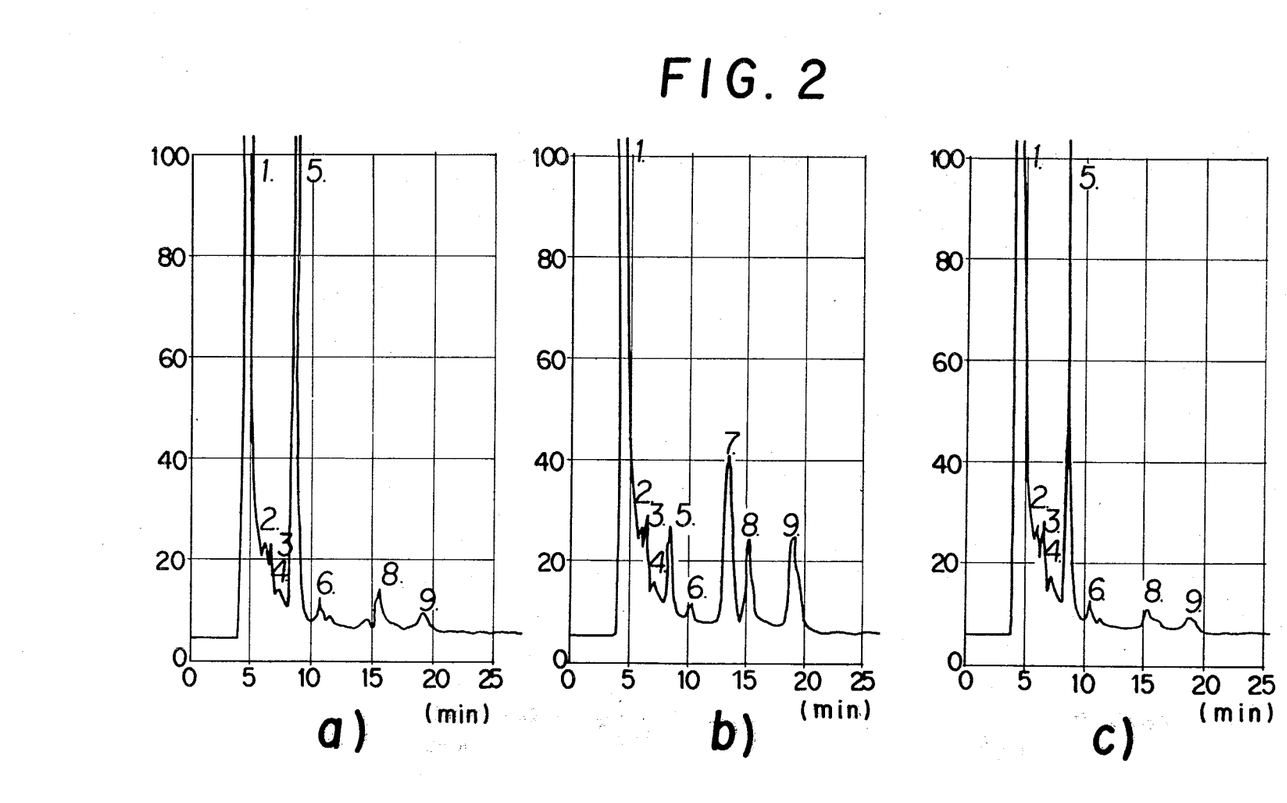
FIG. 2 of the drawings also shows chromatograms of serum specimens obtained by the high-speed liquid chromatography in Example 3, and (a) is the chromatogram of normal serum, and (b) is the chromatogram of the serum of a patient suffering from liver disorder, and (c) is the chromatogram of the same patient after recovering from the liver disorder.

As is shown in FIG. 2 and Table 3, in the serum of the rate administered with D-galactosamine to be a model of the liver disorder, the values of GOT, GPT and bilirubin were clearly abnormal after administration as compared to the values before the administration and after the recovery has begun. Just corresponding to the transition of the above-mentioned values, each of the peaks of more than 5 minutes of the effluent time showed a conspicuous change.

TABLE 3

Result of Chromatography of Rat in Model Liver Disorder with Results of Clinical Examination

| Specimen of serum | Relative Area of each Peak of Nos. | | | | | | | | | Data of Clinical Examination (mg/dl) | | |
|---|---|---|---|---|---|---|---|---|---|---|---|---|
| | 1 | 2 | 3 | 4 | 5 | 6 | 7 | 8 | 9 | GOT | GPT | Bilirubin |
| At normal state | 34156 | 37 | 37 | 13 | 2211 | 73 | — | 246 | 128 | 100 | 70 | less than 0.3 |
| At liver disorder | 35292 | 41 | 155 | 30 | 202 | 38 | 1075 | 512 | 795 | 4560 | 2260 | 3.9 |
| At recovering state | 37911 | 37 | 122 | 65 | 1808 | 78 | — | 56 | 113 | 540 | 520 | 0.5 |
| Effluent time of each peak (min) | 4.5 | 6.3 | 6.8 | 7.4 | 8.8 | 10.6 | 13.8 | 15.4 | 19.1 | | | |

As is possibly understood from the results of the above-mentioned examination, by the application of the high-speed liquid chromatography utilizing the filler composition of the present invention, a chromatographic pattern corresponding to the transition of the morbid state is available also in the case of the liver disorder. On the other hand, the examination of the above-mentioned specimens of the serum by the same chromatography, however, with the column filled with the bead-like oxymethylated copolymer of styrene and divinylbenzene without adsorbed or adhering the human serum albumin gave a chart in which, as is shown in the later part of Example 1, the peak 1 was lower in height and the separation of the peaks 2, 3, 4, 7 and 8 was insufficient.

EXAMPLE 4

Preparation of the column for chromatography (a) Following the procedures in Example 1 of the present invention, 3 g of a hydroxymethylated bead-like copolymer of styrene and divinylbenzene of 10 to 15μ in diameter was filled into a stainless steel tube of 4 mm in internal diameter and of 500 mm×2 in length, and the thus filled tube was set to a chromatograph as its column. After passing a developing liquid through the column and obtaining the steady-state flow, an aqueous 10% by w/v of human albumin solution was passed through the column five times in an amount of 100 μl/time, and after confirming the stabilized background of the detected peaks in the detector, the column was used for the determination as Column A of the present invention.

(b) Comparative Column B was prepared by the same manner as in (a) except for using a copolymer of styrene and divinylbenzene which is commercialized as a filling material for use in liquid column chromatography, made by Hitachi Works Ltd. under the name of Hitachi 3011 filler for liquid chromatography instead of our bead-like hydroxymethylated copolymer of styrene and divinylbenzene.

Results

Figure 3:
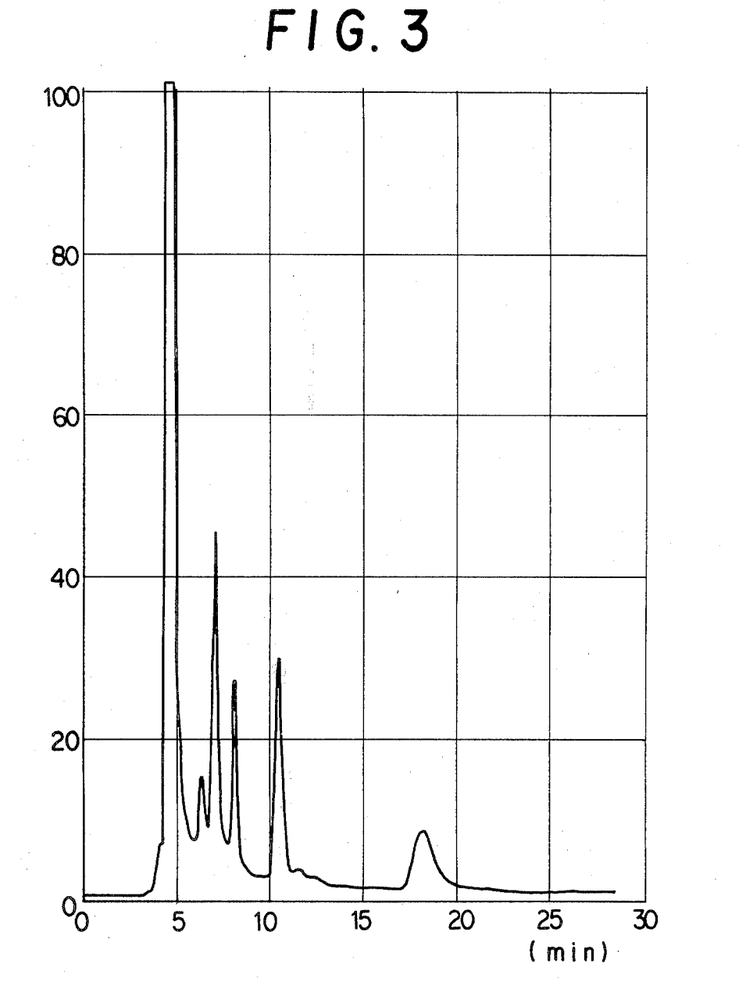
FIG. 3 of the drawings shows the chromatogram of the serum specimen of the patient suffering from renal failure taken while using column according to the present invention.
Figure 4:
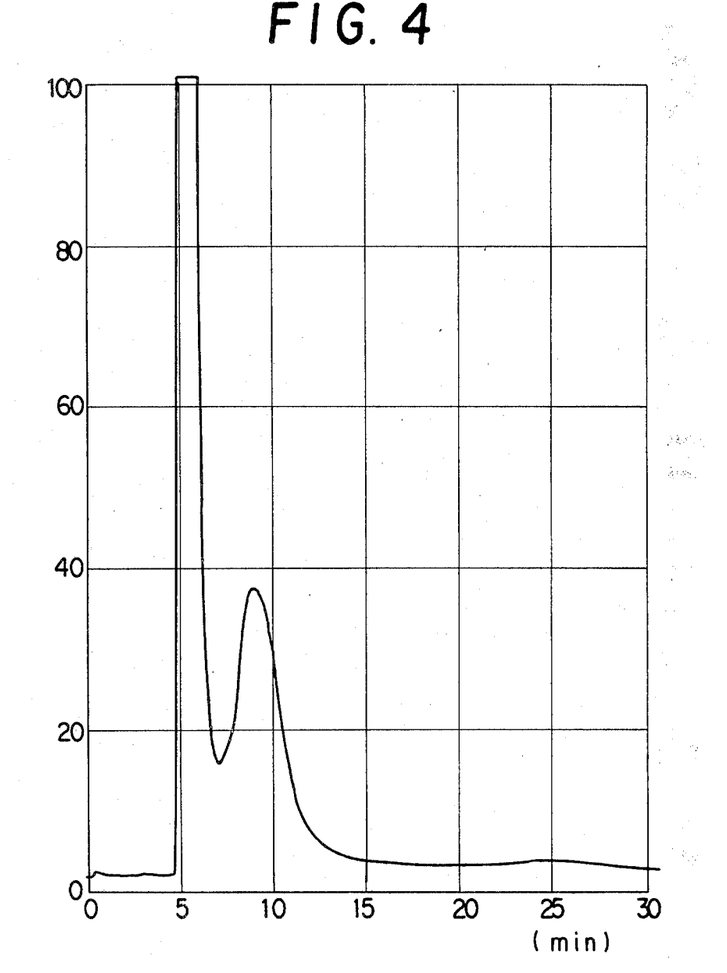
FIG. 4 of the drawings shows the chromatogram of the same specimen, by using compartive column.

Results of the experiment of chromatography are shown in FIGS. 3 and 4, wherein FIG. 3 shows the chromatogram of the serum specimen of the patient suffering from renal failure taken while using Column A according to the present invention (a), and FIG. 4 shows the chromatogram of the same specimen, however, taken by using Comparative Column B. The conditions of chromatography were as follows:

Developing fluid: aqueous 0.05 M phosphoric acid buffer of pH of 7.4
Detector: sensitive to UV of 254 nm
Column: 4 mm in intern. diameter and 500 mm×2 in length
Flow rate of the developing liquid: 1.2 ml/min
Speed of chart: 0.5 cm/min.

While in FIG. 3, the respective peaks a, b, c and f are well separated from each other and it is possible to obtain a sufficient clinical information from them, in FIG. 4 the corresponding peaks show insufficient separation from each other thus making it inadequate to give any clinical information.

As is seen from FIGS. 3 and 4, the composition according to the present invention is quite efficient in chromatographic analysis, and is substantially different from the material of comparative column.

EXAMPLE 5

In a similar manner to that in Example 1 except for using a column of 8 mm in diameter and 25 cm in length filled the same material as in Example 1, examination of a serum of a normal person and a serum of a uremic patient was carried out. The results are shown in FIG. 5.

Using another column of the same size as above prepared by the same procedures except for using a buffer solution of 0.1 M sodium chloride- 0.02 M sodium citrate-caprylic acid containing an antiseptic of 1 microgram per one liter instead of the phosphate buffer solution, examination of the same two serum specimens was carried out. The results are shown in FIG. 6.

Figure 5:
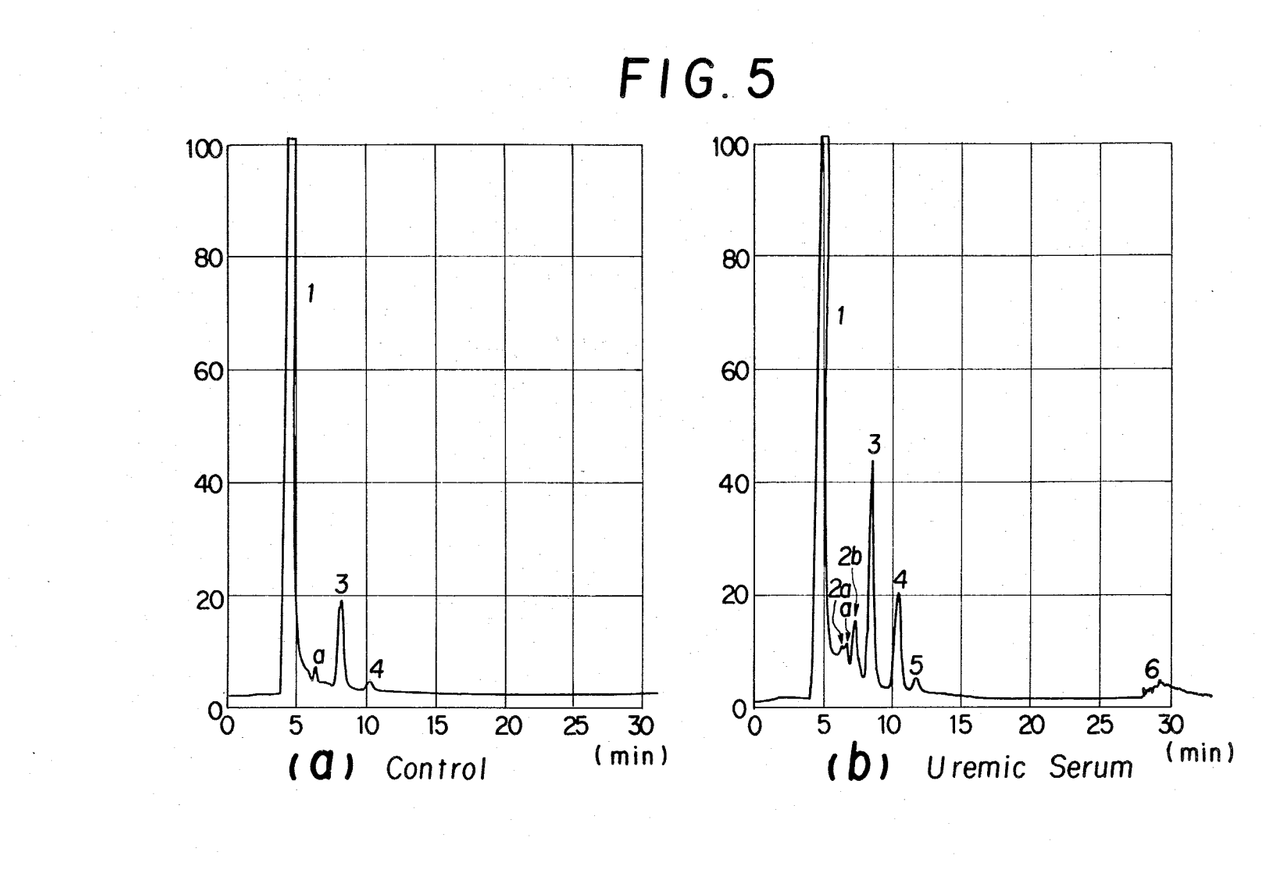
FIG. 5 of the drawings shows the chromatogram of serum specimen of the patient suffering from renal failure in example 5 wherein serum protein is dissolved in phosphate buffer solution.
Figure 6:
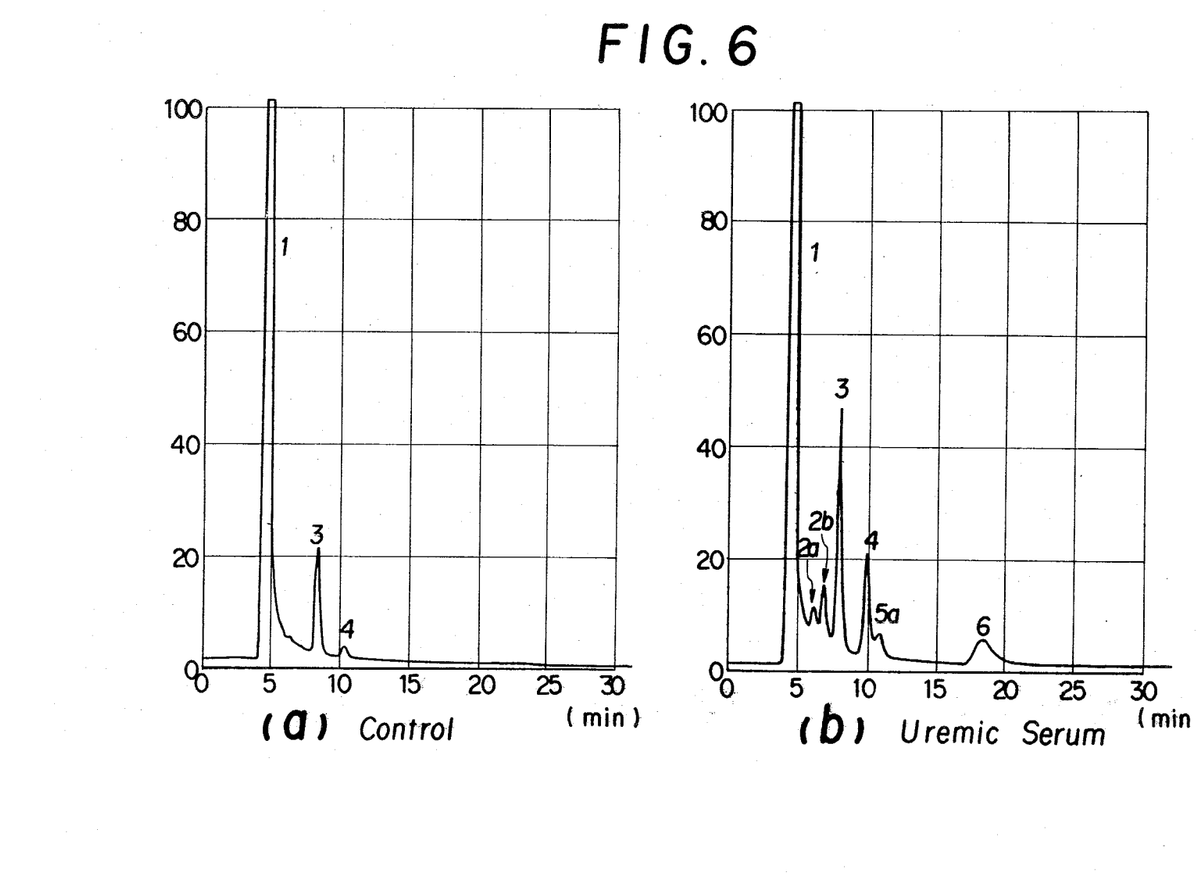
FIG. 6 of the drawings shows the chromatogram of serum specimen of the patient suffering from renal failure in example 5 wherin serum protein is dissolved in citrate buffer solution.

As are seen in FIGS. 5 and 6, serum chromatograms showing excellently well defined patterns could be obtained according to the present invention. In addition, in the latter case of using a citrate buffer solution (refer to FIG. 6), the peak based on the inorganic salts in the serum specimen, corresponding to Peak a in FIG. 5, did not appear in FIG. 6 resulting in easiness of isolating and analysing Peak 2a, and the time for showing Peak 6 was shortened a favorable result of shortening the time for analysis.

What is claimed is:

1. A method for analytically examining a physiological specimen by liquid column chromatography comprising the steps of:
   (a) stabilizing a column comprised of bead-like hydroxymethylated copolymer of styrene and divinylbenzene by passing a phosphate buffer solution or citrate buffer solution in the range of pH 6.5 to 8.0 through the column at a temperature of 5° to 70° C.;

(b) further stabilizing the column by passing an aqueous solution of serum protein containing 0.2 to 5.0% by weight of said serum protein through the column at a temperature of 5° to 70° C. wherein the serum protein is absorbed onto the column; and (c) passing the physiological specimen to be examined through the buffer and protein stabilized column at a temperature of 20° to 40° C. in order to examine the specimen.

2. The method according to claim 1, wherein said solution of a serum protein is prepared by dissolving said serum protein in a solvent selected from the group consisting of water, a buffer solution, a buffer solution containing a salt dissolved therein, and an organic solvent.

3. The method according to claim 1, wherein said liquid column chromatography is high-speed liquid column chromatography.

4. The method according to claim 1, wherein said physiological specimen is a blood component, cerebrospinal fluid, lymph, ascites fluid, urine or other body fluid.

5. The method according to claim 1, wherein the pH of said aqueous solution of serum protein is in the range of 5 to 9.

6. The method according to claim 1, wherein the pH of said phosphate buffer or citrate buffer is in the range of 7.0 to 7.7.

* * * * *